United States Patent [19]

Bahr et al.

[11] 3,771,380

[45] Nov. 13, 1973

[54] TORSIONAL VIBRATION DAMPER

[75] Inventors: Russel F. Bahr; William O. Jankovsky, both of Peoria; William G. Johnson, Pekin; Duane V. Kolb, Roanoke, all of Ill.

[73] Assignee: Caterpillar Tractor Co., Peoria, Ill.

[22] Filed: July 12, 1971

[21] Appl. No.: 161,638

[52] U.S. Cl. .................................. 74/574, 188/1 B
[51] Int. Cl. ............................................. F16f 15/12
[58] Field of Search ...................... 74/574; 188/1 B

[56]  References Cited
UNITED STATES PATENTS

| 3,495,459 | 2/1970 | McLean | 74/574 |
| 3,512,612 | 5/1970 | Bragg et al. | 188/1 B |
| 3,555,926 | 1/1971 | Moorhouse et al. | 188/1 B |
| 2,514,139 | 7/1950 | O'Connor | 74/574 |

FOREIGN PATENTS OR APPLICATIONS

| 1,032,572 | 7/1953 | France | 74/574 |
| 1,939,491 | 2/1970 | Germany | 74/574 |

*Primary Examiner*—Charles J. Myhre
*Assistant Examiner*—F. D. Shoemaker
*Attorney*—Charles M. Fryer et al.

[57] ABSTRACT

A torsional vibration damper comprises a housing adapted to be attached to the crankshaft of an internal combustion engine and an annular weight rotatably mounted in a silicone-filled chamber of the housing. The housing comprises a flat, annular plate secured to an annular case by two electro-beam welds. An O-ring seal is positioned between the plate and case to cooperate with the welds for sealing purpose. Fill ports, adapted to charge the housing's chamber with silicone, each have a lead seal and an overlying expansion plug secured therein.

1 Claim, 3 Drawing Figures

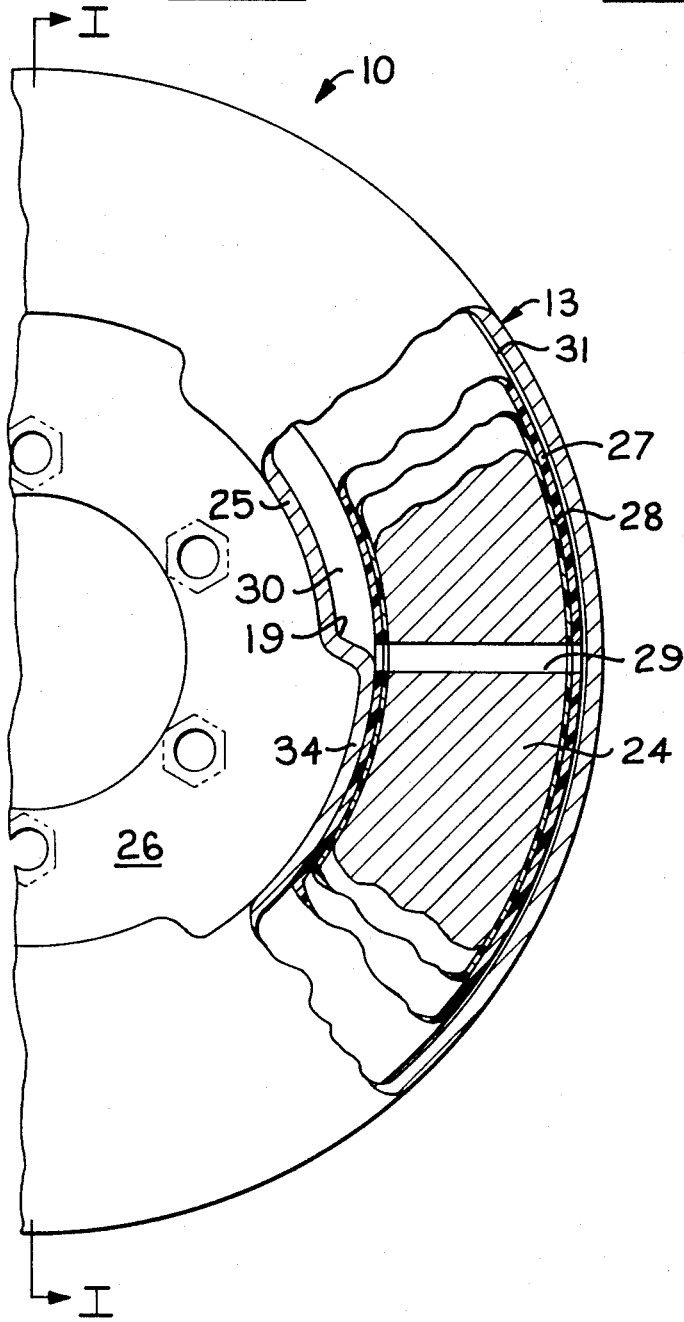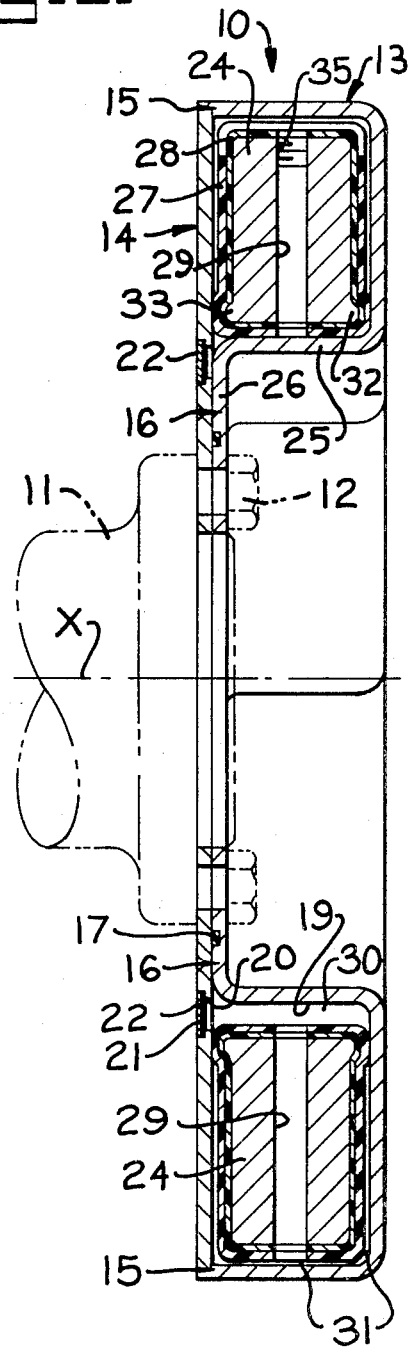

TORSIONAL VIBRATION DAMPER

BACKGROUND OF THE INVENTION

A torsional vibration damper may be attached to the crankshaft of an internal combustion engine to dampen vibrations occasioned during operation thereof. Such vibrations generate dynamic forces which would normally tend to twist the crankshaft and to subject attendant mechanisms to damage. Conventional dampers, such as the ones disclosed in U.S. Pat. Nos. 3,234,817 and 3,512,612, both assigned to the assignee of this application, have proven highly successful for damping and tuning purposes.

SUMMARY AND OBJECTS OF THIS INVENTION

An object of this invention is to provide a non-complex and economical housing for a torsional vibration damper of the above type which exhibits high degrees of manufacturing capabilities, structural integrity and performance desiderata.

The damper of this invention comprises an integrated hub and damper housing having an annular weight rotatably mounted in a chamber thereof. The housing comprises an annular case having three connected walls defining such chamber and a flat, annular plate secured to the case by electro-beam welds. In the preferred embodiment, each weld is recessed by an annular V-shaped groove and an annular seal is positioned between the plate and case for sealing purposes. Fill ports for charging the housing's chamber with a silicone fluid may each be closed by a lead seal and an overlying expansion plug.

DESCRIPTION OF THE DRAWINGS

Other objects of this invention will become apparent from the following description and accompanying drawings wherein:

FIG. 1 is a cross-sectional view of a torsional vibration damper embodying the present invention, taken in the direction of arrows I—I in FIG. 2;

FIG. 2 is a partially sectioned, side elevational view of a portion of the damper.

DESCRIPTION OF THE PREFERRED EMBODIMENT

Figure 3:
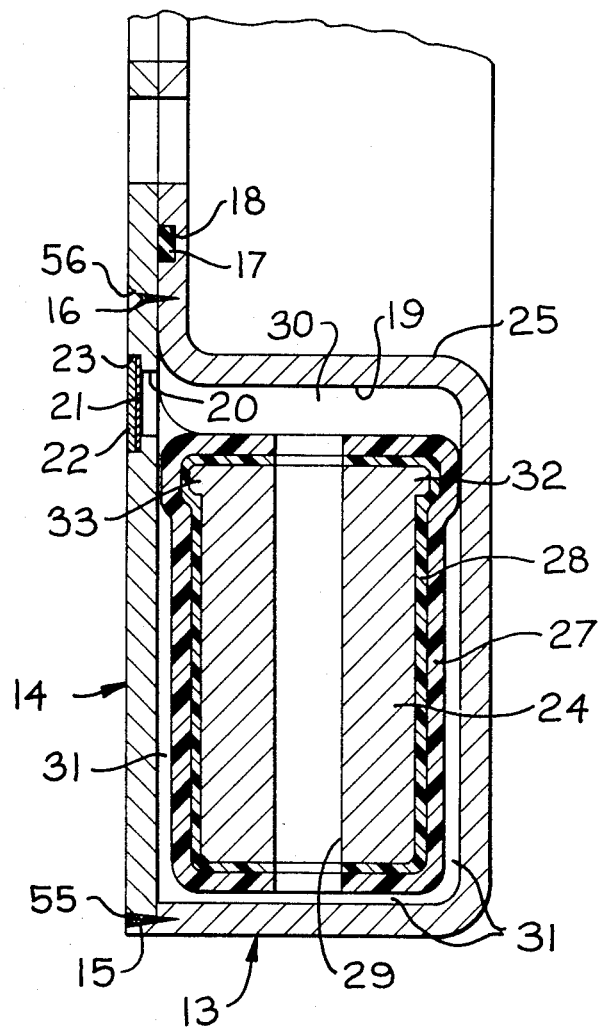
FIG. 3 is an enlarged, sectional view of the lower portion of the damper as illustrated in FIG. 1

The FIGS. 1-3 damper is disposed on a central rotational axis X and comprises an integrated hub and housing assembly 10 adapted to be attached to a crankshaft 11 of an internal combustion engine by circumferentially spaced bolts 12. The two-part housing assembly comprises an annular case 13 and a flat circular plate 14 secured together by annular electron-beam weld means 14 and 16. The case and plate may each comprise a cold rolled SAE 1008, aluminum killed steel, for example, which is particularly adapted for electron-beam welding.

An annular O-ring seal or sealing means 17 is positioned in a mating groove 18 formed on case 13, adjacent to and radially inwardly of weld 16 (FIG. 3). A closed, annular chamber 19 contains a highly viscous (e.g., one million centistokes) silicone fluid. The chamber is filled via one of two diametrically disposed port means 20 and the port means are thereafter closed by means of a lead seal 21 and overlying Welsh-type expansion plug 22 mounted in a counterbore portion 23. The second port means is utilized for air purging purposes during the filling operation.

An annular inertia weight 24 is rotatably mounted in a closed chamber, defined by connected parallel inner and outer walls and a transverse sidewall of the case and by plate 14. The weight cooperates with the surrounding silicone fluid to provide the damping and tuning desiderata. The weight is rotatably mounted on an axially disposed hub or inner wall 25 attached to a radially disposed and offset annular flange 26 attached to crankshaft 11.

The weight may comprise an iron casting or other weighty material substantially covered with a plastic bearing material or coating 27, such as nylon, Teflon or bronze having a uniform thickness approximating 0.015 in., secured on a conventional primer 28, such as a 253-P primer manufactured by the M&T Chemical Co. In addition to the bearing contact provided, the plastic material prevents contact between the metallic weight and housing.

A plurality of radial passages 29 are formed through the weight and coating 27 to communicate the highly viscous silicone fluid from chamber portions 30 to clearances 31, defined between the weight and the sidewalls and outer wall of the housing. The clearances are precisely defined and maintained during damper operation by means of axially aligned annular shoulders or spacing means 32 and 33, formed at the radially inner portion of the weight. Chamber portions 30, similar to those described in U.S. Pat. No. 3,512,612, normally retain a substantially large portion of the silicone fluid and are prefabricated in the form of recesses defined by circumferentially spaced and raised surface portions 34 formed on hub 25. One of the passages is preferably tapped at the radially outer end thereof, as shown at 35 in FIG. 1, to provide threads adapted to have an eye bolt secured therein for transport purposes during fabrication of the weight.

The damper may be fabricated as taught in U.S. Patent application Ser. No. 146,257, filed on May 24, 1971 by Gary O. Bragg et al. The damper is assembled by centering the weight on raised portions 34 of the housing and by seating O-ring seal 17 in groove 18 (FIGS. 1 and 3). Plate 14 is then secured to case 13 by annular electron-beam welds 15 and 16.

The outer surface of the plate preferably has annular grooves 55 and 56 of generally V-shaped cross-section and limited depth pre-formed thereon to assure the desired penetration of welds 15 and 16 through the plate and into the abutting free edge of the outer wall and flange 26 of the case. In addition, the welds preferably terminate adjacent to the apex of a respective groove so as not to protrude beyond the outer surface of the plate which might inhibit correct assembly by a drive pulley or the like thereon. Also, the welding operator is provided with an accurate line or template by which to weld.

Chamber 19, including chamber portions 30, is thereafter filled with a viscous fluid via one of the ports 20. The second port permits air to escape during the filling operation wherein the damper is maintained horizontally. When the chamber has received the proper amount of fluid, lead seals 21 are placed within counterbores 23 of ports 20 (FIG. 3) and locked in place by means of expansion plugs 22.

The positioning of weld 15, so that it penetrates through plate 14 and into case 13, assures a secure bond and positive seal thereat. In contrast thereto, weld 36 of U.S. Pat. No. 3,512,612, for example, is subjected to shearing forces which may tend to separate the plate and case. The positioning of welds 15 and 16 on a common surface of the plate further facilitates the welding operation.

Electron beam welding allows the use of a thin-walled plate and case which can be stamped, hydroformed or otherwise suitably formed pursuant to economical mass production techniques. The resulting relative lightness of the structurally integrated damper housing tends to reduce the parasitic mass of the damper. Otherwise stated, the total mass of the housing and attached crankshaft 11 is significantly reduced in proportion to the mass of weight 24 thereby improving damper performance.

The use of electron beam welding, due to the inherent low heat concentrations thereof, also prevents distortion of the housing. Thus, the various dimensional tolerances designed into the damper may be kept within the necessary ranges without the need for subjecting the housing to costly machining operations. In addition, the case may be filled with silicone prior to securance of cover plate 14 thereon since the low heat concentrations will have little, if any, effect on the silicone.

We claim:

1. A torsional vibration damper disposed for rotation about a central axis thereof comprising a housing having an annular weight rotatably mounted therein, said weight being encased in a plastic material, said housing comprising an annular case having inner and outer walls disposed parallel to said axis and connected together by a transverse side wall, extending radially outwardly from said axis, to define an annular chamber having said weight rotatably mounted therein, an annular flange connected to said inner wall in offset relationship with respect to said side wall and extending radially inwardly toward said axis, a flat circular plate abutting a free edge of said outer wall and said flange to close said chamber, spaced annular electro-beam weld means on said plate penetrating through said plate and into said case for securing said plate to each of the free edges of said outer wall and said flange, means forming an annular groove of limited depth at an outer surface of said plate adjacent to each one of said weld means, each of said grooves having a generally V-shaped cross section and terminating at an apex thereof at a respective one of said weld means, an annular seal means positioned between said plate and said flange adjacent to and radially inwardly from the weld means securing said plate to said flange, and two diametrically disposed port means formed through said plate to communicate with said chamber, each of said port means having a counterbore portion formed at an outer surface of said plate, and a lead seal and overlying expansion plug mounted in said counterbore portion.

* * * * *